April 22, 1924.
F. D. CHAPMAN
1,491,031
APPARATUS FOR AGITATING FOODSTUFFS AND THE LIKE
Filed Sept. 15, 1921     3 Sheets-Sheet 3
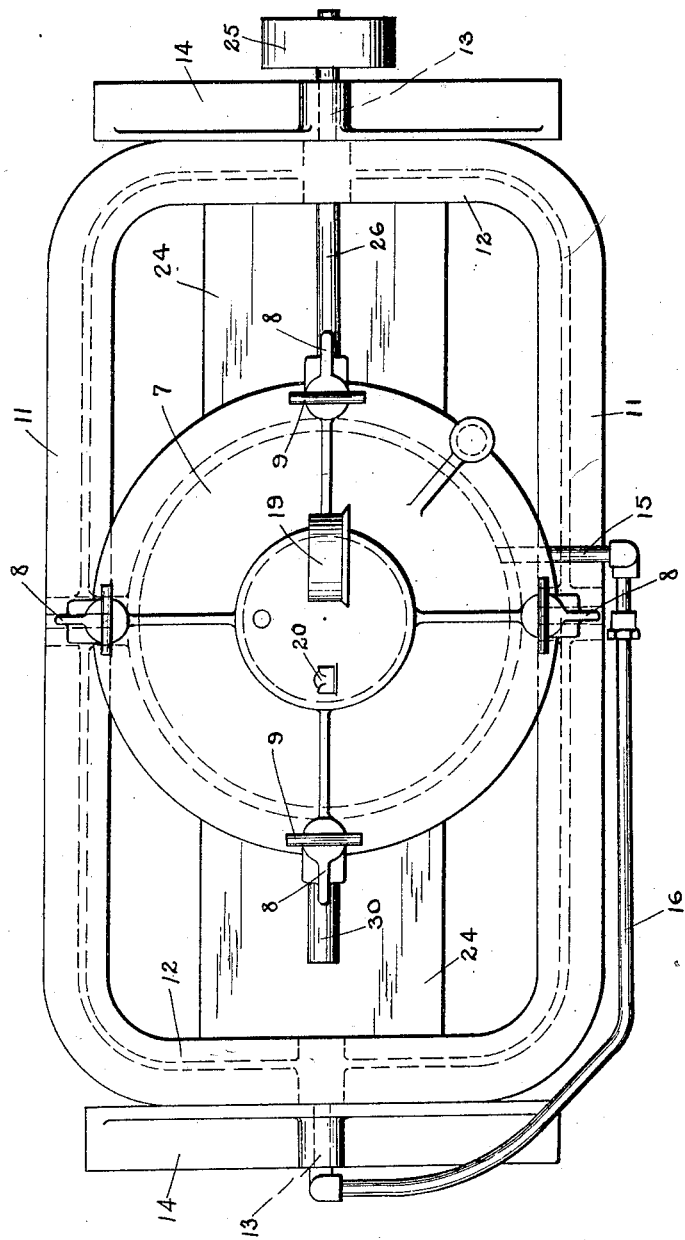
INVENTOR.
Frank Dalton Chapman
BY
Morsell + Keeney
ATTORNEYS.

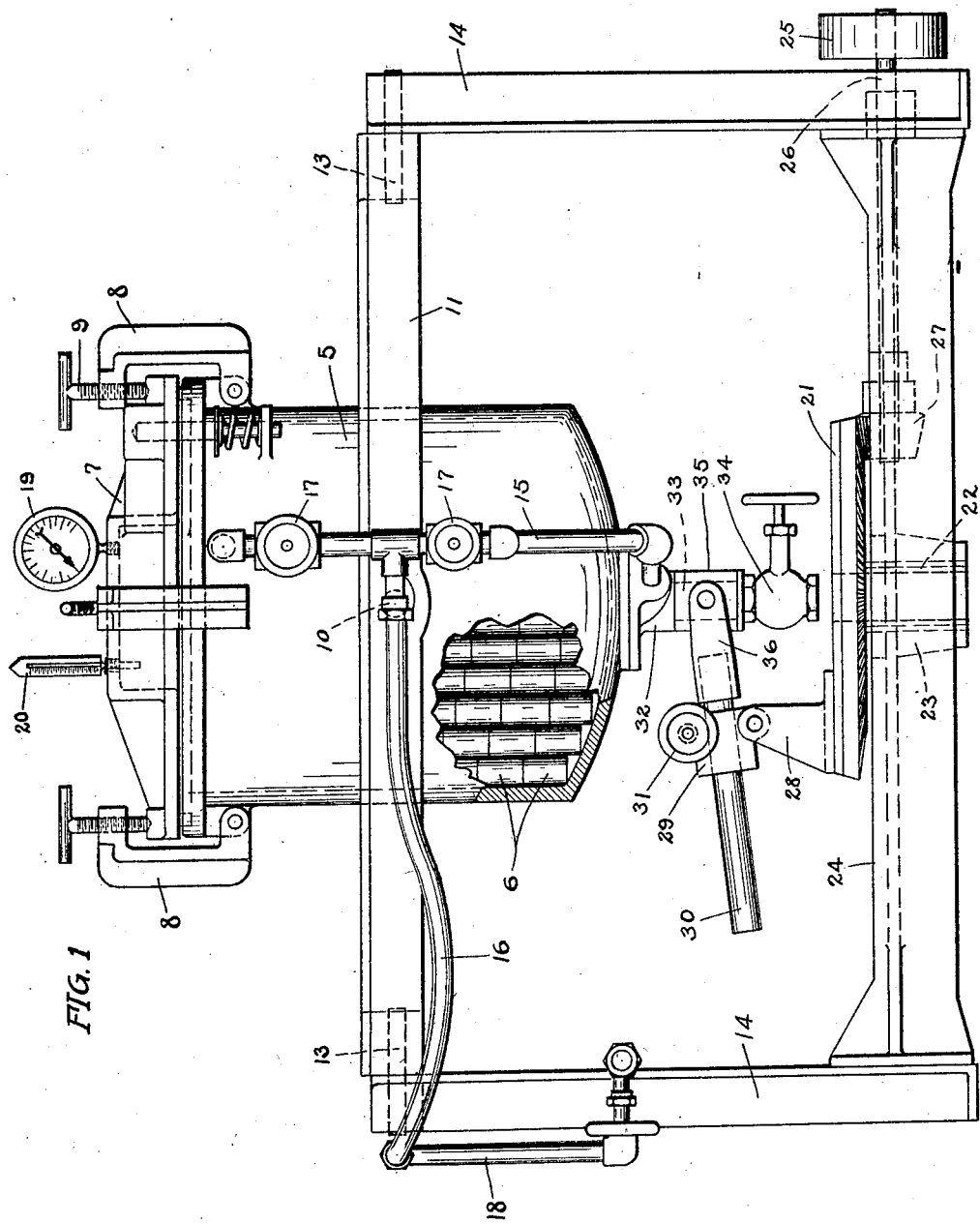

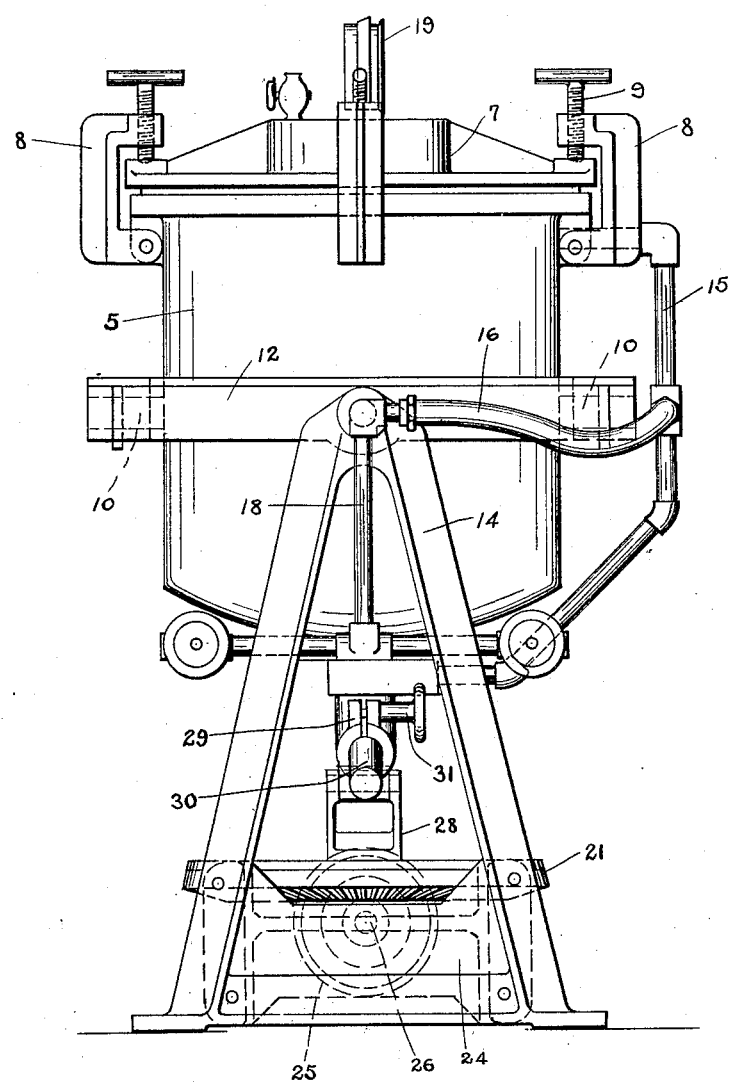

Patented Apr. 22, 1924.

1,491,031

UNITED STATES PATENT OFFICE.

FRANK DALTON CHAPMAN, OF BERLIN, WISCONSIN.

APPARATUS FOR AGITATING FOODSTUFFS AND THE LIKE.

Application filed September 15, 1921. Serial No. 500,746.

*To all whom it may concern:*

Be it known that I, FRANK DALTON CHAPMAN, a citizen of the United States, and resident of Berlin, in the county of Green Lake and State of Wisconsin, have invented new and useful Improvements in Apparatus for Agitating Foodstuffs and the like, of which the following is a description, reference being had to the accompanying drawings, which are a part of this specification.

This invention relates to apparatus for agitating food stuffs, and the like; and one of the objects of the invention is to provide means whereby the receptacle or vessel containing cans of food stuffs may be agitated while the food is being cooked so that the food in the cans will be agitated or turned over and thoroughly and uniformly subjected to the action of the heating medium, for example, steam.

A further object of the invention is to provide novel means for mounting the receptacle which is of such construction that the receptacle has capacity for universal movement, the preferred arrangement being to provide suitable supporting standards on which a framework is pivotally mounted, the frame pivotally supporting the receptacle, the pivots supporting the receptacle being arranged at right angles to those supporting the frame on the standards.

A further object of the invention is to provide means for agitating the universally mounted receptacle which is of such construction that the axis of the receptacle will describe a cone while being agitated so that the cans of food placed in the receptacle will be positioned obliquely and carried around in a circular path so that the food in the cans will be more or less turned over and over and all the food thoroughly and uniformly subjected to the action of the heating medium.

In its preferred form the invention contemplates a driving member positioned horizontally under the receptacle; and a further object of the invention is to provide an arm pivotally and adjustably connected to the driving member and which is swivelly connected with the receptacle whereby the receptacle may be positioned obliquely and agitated so that the axis of the receptacle will describe cones, the bases of which may be varied, as desired. This arrangement permits the receptacle to be so positioned that the particular kind of food being cooked will receive the proper amount of agitation. This is important in view of the fact that some food stuffs, for example, canned pumpkin, are of such consistency that they are not as easily agitated or turned over as other food stuffs, like canned soups, for example, which contain considerable liquid and which may be very easily agitated.

The invention consists in the novel constructions and arrangements to be hereinafter described and claimed for carrying out the above stated objects and such other objects as will appear from the following specification.

The invention is illustrated in a certain preferred embodiment shown in the accompanying drawings, wherein—

Fig. 1 is a side elevational view of apparatus embodying the principles of the invention;

Fig. 2 is an end elevational view of the apparatus; and

Fig. 3 is a plan view of the apparatus.

Like characters of reference designate like parts in the several views.

Referring now to the drawings, it will be seen that a closed receptacle or vessel 5 is provided in which the cans 6 containing the foods stuffs to be treated may be closely packed substantially as shown in Fig. 1. The receptacle 5 is provided with a cover member 7 which is securely fastened in place by a plurality of clamping members 8 pivotally mounted at their lower ends on the receptacle, and carrying at their upper ends clamping screws 9 adapted to bear against the top of the cover 7.

The receptacle 5 is mounted so that it may be agitated while the food stuffs are being treated, the preferred arrangement being to provide a pair of oppositely disposed pivot pins 10 on the receptacle which are adapted to rest in suitable bearings provided in side members 11, the latter being connected at their ends by end members 12, thus providing a rectangular frame in which the receptacle 5 is pivotally mounted. The end members 12 of the frame are provided with a pair of oppositely arranged pivots 13 which project into suitable bearings formed in a pair of supporting standards 14, the pivot pins 13 being arranged at right angles to the pivot pins 10 so that the receptacle 5 has capacity for universal movement, the frame being adapted to rock in one direction and carrying the receptacle with it and the receptacle itself being adapted to rock in the frame in the opposite direction.

The receptacle 5 may be heated in any desired manner. In the embodiment herein shown one or more branch steam pipes 15 connected to one end of a flexible conduit member 16 lead into the receptacle 5 at different places, suitable valves 17 being provided for controlling the flow of the heating medium. The other end of the conduit 16 is attached to a steam supply pipe 18 extending and fastened to one of the supporting standards 14. A pressure gauge 19 may be provided on the receptacle 5 for indicating the amount of pressure therein and a thermometer 20 may also be provided, if desired, for indicating the temperature within the receptacle.

The receptacle 5 is preferably mounted so that when it comes to rest or when it is in its normal position, its axis will be perpendicular. The means for agitating the receptacle while the food stuffs are being treated preferably includes a driving element, for example, a bevelled gear 21, positioned horizontally under the receptacle, said gear being connected to a sleeve 22 which is journaled in a bearing 23 provided in a longitudinally extending member 24 attached to the supporting standards 14. Power is supplied by means of a pulley 25 mounted on a shaft 26 journaled in one of the supporting standards 14 and the frame member 24, the inner end of the shaft carrying a bevelled pinion 27 which is in mesh with the gear 21. Attached to the back or upper side of the gear 21 is an upstanding bracket member 28 pivotally supporting a two-part clamping device 29 which surrounds an arm 30, the arm being slidable in the device and the parts of the device being drawn about the arm by a screw 31. An apertured flanged member 32 is secured to the bottom of the receptacle 5 to provide a supporting means for a short length of pipe 33 the upper end of which is in communication with the receptacle 5 and the lower end of which carries a valve 34. Between the flange member 32 and the valve 34 and loosely mounted on the pipe 33 is a collar 35 which is pivotally connected to a bifurcated member 36 mounted on the adjacent end of the arm 30.

Operation: The food stuff to be treated is packed in suitable containers, for example, cans, which are sealed and are preferably placed on end and closely packed in the receptacle 5, as clearly shown in Fig. 1. Steam is permitted to enter the receptacle 5 to cook the food stuffs and while the food stuffs are being cooked, the receptacle 5 is agitated. The arm 30 is adjusted in the clamping device 29 so as to position the receptacle 5 obliquely, that is to say, with its axis at an angle with respect to the perpendicular. As the gear 21 rotates, the receptacle 5 is moved so that its axis will describe a cone. By adjusting the arm 30 in the clamping device 29, the receptacle 5 may be agitated in a manner to cause its axis to describe cones, the bases of which may be varied as desired. The inclination at which the receptacle 5 travels through the various circular paths determines the angualr position of the cams of food stuffs packed in the receptacle. When the food stuffs being treated contain a considerable amount of solid matter, for example, canned pumpkin, the inclination of the receptacle 5 will be much greater than when the food stuffs contain a large amount of liquid, for example, soups of various kinds. By varying the inclination of the receptacle 5 as above described and operating it at various speeds, all kinds of food stuffs may be thoroughly and uniformly cooked or treated, the contents of the cans packed in the receptacle 5 being kept in motion and agitated in a manner to cause the food stuff in the center of each can to be brought to the outside or in contact with the walls of the can and that adjacent the walls of the can being shifted to the center of the can. When the receptacle is in its normal position as shown in Fig. 1 any condensation or other liquid may be drained therefrom by opening the valve 34, the discharge being through the sleeve 22.

I claim:

1. In apparatus of the class described, the combination of a receptacle, means for mounting said receptacle so that it has capacity for circular swinging movement, a driving member, an arm mounted on said member, a stud fixed to said receptacle, and a collar on said stud, said arm being pivotally connected to said collar, for the purpose specified.

2. In apparatus of the class described, the combination of a receptacle, means for mounting said receptacle so that it has capacity for rotary movement, a driving member, a clamping device pivotally mounted on said member, an arm adjustably positioned in said device, a stud fixed to said receptacle, and a collar on said stud, said arm being pivotally connected to said collar, for the purpose specified.

3. In apparatus of the class described, the combination of a supporting means, a frame, pivots for mounting said frame on said means, a receptacle, pivots for mounting said receptacle on said frame, said first and second mentioned pivots being arranged at right angles to each other, a driving member, an arm adjustably mounted on said member, and means connecting said arm to said receptacle, for the purpose specified.

4. In apparatus of the class described, the combination of a supporting means, a frame, pivots for mounting said frame on said means, a receptacle, pivots for mounting said receptacle on said frame, said first and second mentioned pivots being arranged at right angles to each other, a driving member, a clamping device pivotally mounted on said member, an arm adjustably positioned in said device, a stud fixed to said receptacle, and a collar on said stud, said arm being pivotally connected to said collar, for the purpose specified.

5. In apparatus of the class described, the combination of a receptacle, means for mounting said receptacle so that it has capacity for rotary movement, a driving member, an arm mounted on said member, a pipe depending from the bottom of said receptacle, a valve for said pipe, and a collar on said pipe, said arm being pivotally connected to said collar, for the purpose specified.

In testimony whereof, I affix my signature.

FRANK DALTON CHAPMAN.